United States Patent [19]
Cawley

[11] 3,898,527
[45] Aug. 5, 1975

[54] MOTOR PROTECTION APPARATUS AND METHOD

[75] Inventor: Richard E. Cawley, Hurst, Tex.

[73] Assignee: Lennox Industries, Inc., Marshalltown, Iowa

[22] Filed: June 26, 1974

[21] Appl. No.: 483,293

[52] U.S. Cl............... 317/13 R; 317/40 R; 62/228; 307/116; 317/135 R; 317/155
[51] Int. Cl............................................ H02h 7/08
[58] Field of Search...... 317/13 R, 13 C, 9 A, 60 R, 317/135 R, 137, 155, 139; 307/118, 116, 141.8, 144; 62/230, 228, 226, 172; 340/240; 318/221 R, 221 A, 472, 473

[56] References Cited
UNITED STATES PATENTS

| | | | |
|---|---|---|---|
| 2,470,257 | 5/1949 | Moore | 317/60 R |
| 2,635,200 | 4/1953 | Berry | 317/135 R X |
| 3,358,468 | 12/1967 | Shaw | 62/228 X |
| 3,443,394 | 5/1969 | Knonick | 62/228 x |
| 3,656,023 | 4/1972 | Hadfield | 317/13 R |
| 3,688,157 | 8/1972 | Spears | 317/13 R |

Primary Examiner—J. D. Miller
Assistant Examiner—Patrick R. Salce
Attorney, Agent, or Firm—Molinare, Allegretti, Newitt & Witcoff

[57] ABSTRACT

The disclosure describes an improved apparatus and method for protecting the motor of a refrigerant compressor. The apparatus includes first and second magnetic contactors which are connected in series between a source of three-phase AC voltage and the compressor motor. If one of the contactors fails in the closed position, the other contactor will open to protect the compressor motor. Control circuitry normally operates the contactors simultaneously so that each of the contactors is periodically opened and closed in accordance with the demands for operation of the compressor. By using this technique, the reliability of the contactors is improved and the motor is protected against overload conditions. One of the contactors may be controlled by a pressure sensor in the suction line of the compressor, so that the compressor motor can be turned off by a decrease in suction line pressure if the other contactor fails in the closed position.

15 Claims, 3 Drawing Figures

MOTOR PROTECTION APPARATUS AND METHOD

BACKGROUND AND SUMMARY OF THE INVENTION

This invention relates to refrigerant compressors and, more particularly, relates to apparatus for protecting the electric drive motor of a refrigerant compressor.

A variety of devices have been produced for the purpose of protecting three-phase AC motors. Some of these devices include the provision of first and second switches arranged so that the first switch will open to disconnect the motor from its voltage source in the event that the second switch fails in the closed position.

Such devices are illustrated in U.S. Pat. No. 2,470,257 (Moore - May 17, 1949) and U.S. Pat. No. 3,656,023 (Hadfield - Apr. 11, 1972). Each of these patents illustrates a protection circuit in which a main or working contactor normally controls the flow of electrical current to a three-phase motor. A safety switch is normally closed and is opened only if the working contactor fails in the closed position. The applicant has discovered that this arrangement has a number of disadvantages which are overcome by the present invention. A normally closed safety switch has a tendency to stick in the closed position due to ordinary wear and contamination. Contamination may result from insect juices, which are sticky and glue-like. As a result, after a period of time in field service, the safety switch becomes ineffective and useless as a safety switch.

In order to overcome the deficiencies of the prior art, the applicant has discovered that a compressor motor can be safely protected by two switches connected in series between the motor and a source of AC voltage which are both normally opened and closed in response to a demand for operation of the motor. By periodically opening and closing both of the switches, the overall switching arrangement is less susceptible to failure in field service.

Accordingly, it is a principal object of the present invention to provide first and second switches connected in series between a compressor motor and an AC source which are normally both opened and closed in response to demand for operation of the compressor motor in order to improve the reliability of the switches.

It is another object of the present invention to provide a switching arrangement of the foregoing type in which the first switch is opened in response to the condition of a third switch that is operated simultaneously with the second switch, so that the first switch opens if the second switch fails in the closed position.

Still another object of the invention is to provide a switching arrangement of the foregoing type in which a device sensitive to the pressure in the suction line of the compressor operates the first switch in the event that the pressure decreases below a predetermined value, so that the compressor motor is turned off by the decreased suction pressure if the second switch fails in the closed position.

A switching arrangement of the foregoing type offers a number of advantages, including magnification of system reliability. For example, if the first switch is 99.5 percent reliable from the standpoint of failing in the closed position, the odds for causing a compressor failure by using the first switch alone would be 0.5 percent or 1 in 200. However, if a 99.5 percent reliable second switch is connected in series with the first switch, the odds of a compressor failure are greatly reduced, since both switches would have to fail closed. The likelihood of a failure under these circumstances would be 1/200 × 1/200 = 1/40,000. In other words, if the first and second switches are both 99.5 percent reliable from the standpoint of failing closed, the use of two such switches improves the system reliability by a factor of 200.

Using first and second switches in series also virtually eliminates failures resulting from specific problems associated with a particular switch manufacturer. By using two switches, one of the switches can be supplied from one manufacturer and the other switch from another manufacturer. As a result, if one of the manufacturers has a coil sticking problem associated with its switch, where as the other manufacturer does not, the use of both switches in series would prevent compressor failure.

BRIEF DESCRIPTION OF THE DRAWING

These and other objects, advantages and features of the present invention will hereafter appear in connection with the accompanying drawing wherein.

DETAILED DESCRIPTION OF THE PREFERRED EMBODIMENT

Figure 1:
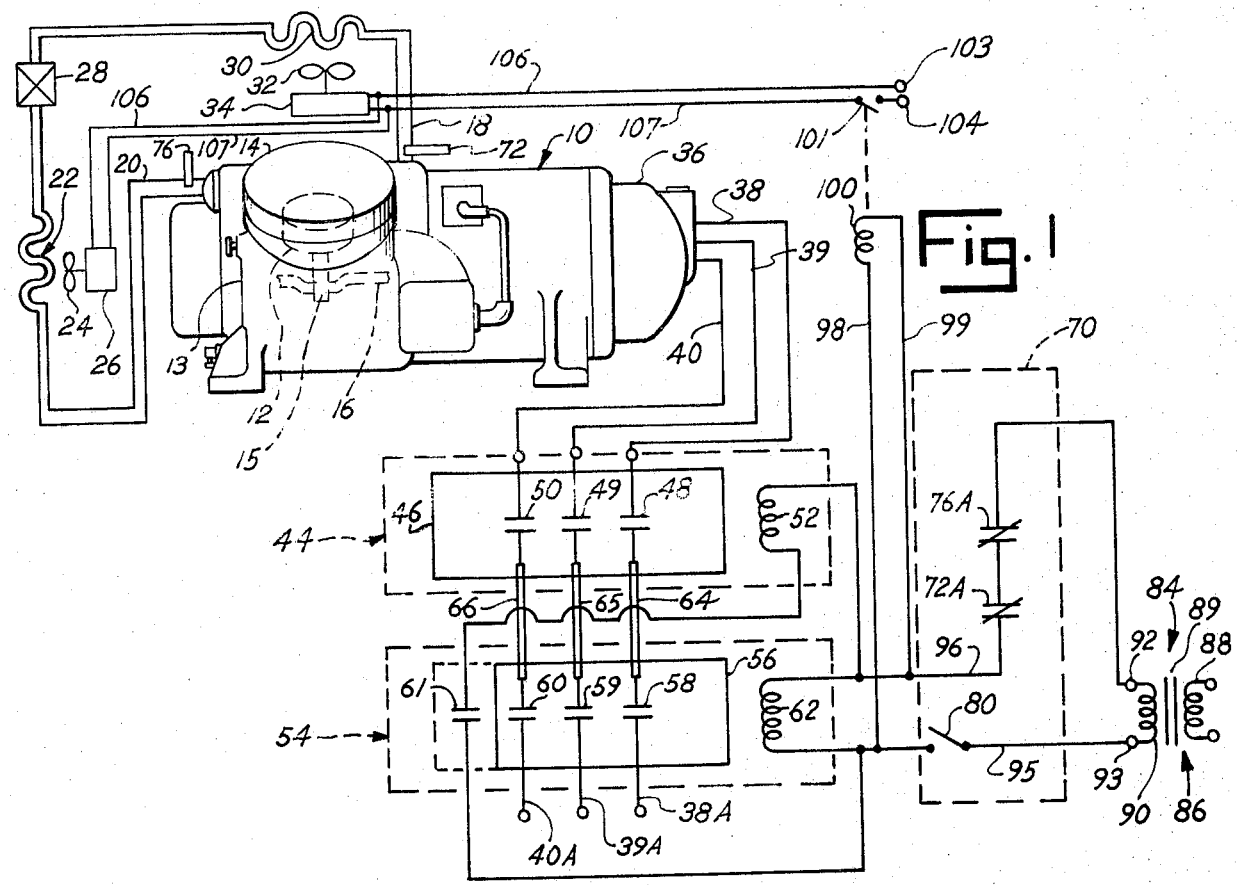
FIG. 1 is a schematic drawing of a preferred form of the switching apparatus made in accordance with the present invention for use in connection with a conventional compressor.

Referring to FIG. 1, a preferred form of the present invention may be used in connection with a conventional refrigerant compressor 10 comprising a piston 12 which reciprocates in a cylinder 13 covered by a cylinder head 14. The piston is driven by a connecting rod 15 through a rotating crank shaft 16. The compressor 10 is in a refrigeration system including a suction line 18 through which relatively low pressure refrigerant gas or suction gas is drawn into the cylinder above piston 12. The piston compresses the refrigerant gas in a well-known manner and transmits the compressed gas through a discharge line 20 to a conventional condenser coil 22. The compressed gas in the condenser coil is cooled and thereby liquified by air from condenser fan 24 that is driven by electric motor 26.

The refrigerant is passed through a thermal expansion device, e.g., valve 28 and an evaporator coil 30. A fan 32 driven by an electric motor 34 circulates the air over coil 30 and the cooled air passes into a space, such as a room, which is to be cooled.

A conventional three-phase compressor motor 36 drives crank shaft 16 in a conventional manner. Three-phase AC current is received by the motor through conductors 38–40 and like conductors 38A–40A, the conductors being separated by magnetic contactors 44 and 54.

A preferred form of switching apparatus for use in connection with compressor 10 basically comprises a first magnetic contactor 44, a second magnetic contactor 54, a pilot or operating circuit 70 and a generator circuit 84.

Magnetic contactor 44 comprises a switch assembly 46 including normally open ganged switches 48–50 that are controlled by an operating coil 52. Magnetic contactor 54 comprises a switch assembly 56 including normally open, ganged switches 58–60. A normally open switch 61 is also ganged with switches 58–60 and may be physically mounted on contactor 54. Contactor 54, including switch 61, is controlled by a conventional operating coil 62. Contactors 44 and 54 are connected by rigid copper bars 64–66 in the manner shown.

Operating circuit 70 comprises a low pressure sensor 72 mounted in suction line 18 which opens normally closed contacts 72A when the pressure in suction line 18 decreases below a predetermined value. Circuit 70 also includes a high pressure sensor 76 located in discharge line 20 which opens normally closed contacts 76A when the pressure in discharge line 20 exceeds a predetermined value. A thermostatic switch 80 opens when the environment temperature to be controlled by the compressor decreases below a predetermined value. Switch 80 may include a conventional thermostat, such as a mercury ball enclosed in a glass envelope mounted on a bimetallic coil which rotates the envelope in response to fluctuations in temperature.

Generating circuit 84 comprises a step down transformer 86 including a primary 88 which is magnetically coupled to a secondary 90 by a core 89. Secondary 90 steps down the primary source to 24 volts AC measured across terminals 92 and 93. The signal generated by the secondary 90 is a pilot signal which is conducted through the pilot circuit by conductors 95 and 96. Additional conductors 98 and 99 are connected from the pilot circuit to a conventional relay coil 100 which closes a normally open contact 101 in response to the pilot signal. Contact 101 completes the circuit from terminals 103, 104 to fan motors 26 and 34 through conductors 106 and 107. Terminals 103 and 104 are connected to a source of single phase electrical power.

The embodiment shown in FIG. 1 operates in the following manner. Assuming the contacts and switches are in their normal positions shown in FIG. 1, no electrical current is transmitted through conductors 38–40 to motor 36, and compressor 10 is not operating. As soon as the temperature of the environment being controlled exceeds the predetermined value established by thermostatic switch 80, switch 80 closes so that the pilot signal is conducted through operating coil 62 and normally closed contacts 72A, 76A. In response to the pilot signal, operating coil 62 creates a magnetic field which closes switching assembly 56 so that switches 58–61 are moved to their closed positions. As a result, the pilot signal is also transmitted through closed switch 61 to operating coil 52.

Operating coil 52 generates a magnetic field which moves switches 48–50 to their closed positions. At this point in time, both switch assemblies 46 and 56 are closed, and three-phase electrical current is transmitted by conductors 38–40 to motor 36, so that compressor 10 begins to operate. At the same time, switch 80 is closed, the pilot signal is transmitted through relay coil 100 so the contact 101 is closed and fan motors 26 and 34 begin to operate. As the compressor 10 operates, the temperature of the environment being controlled decreases.

As soon as the temperature decreases below a value determined by the setting of thermostatic switch 80, switch 80 opens so that the pilot signal is no longer transmitted through operating coils 52 and 62. As a result, switching assemblies 46 and 56 are moved to their open positions, and the operation of motor 36 and compressor 10 is discontinued. Contactors 44 and 54 are biased so that switch assemblies 46 and 56 are normally moved to their open positions absent a magnetic field created by operating coils 52 and 62. When switch 80 opens, the pilot signal through relay coil 100 is interrupted so that contact 101 opens, and fan motors 26 and 34 no longer operate.

In the event that switches 58–61 stick in the closed position after thermostatic switch 80 is open, operating coil 52 no longer receives the pilot signal. Switches 48–50 are moved to their open positions, thereby preventing current from being conducted to motor 36. Likewise, if switches 48–50 stick in the closed positions after switch 80 is open, the pilot signal is no longer transmitted through operating coil 62, so that switches 58–61 are moved to their open positions, thereby preventing the flow of current to motor 36.

Figure 2:
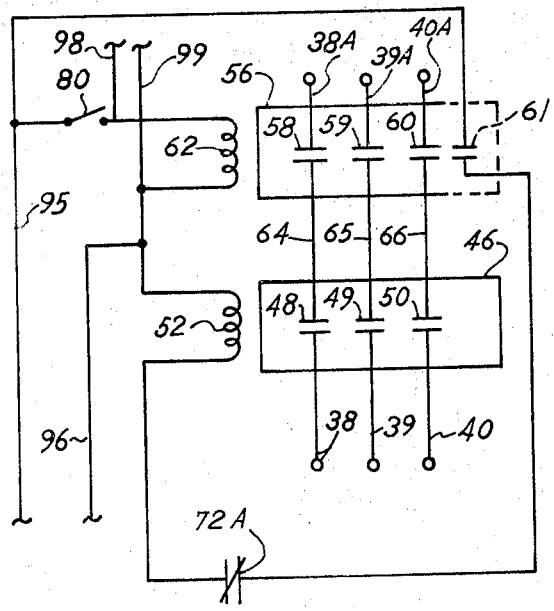
FIG. 2 is a schematic drawing illustrating an alternative embodiment of the switching apparatus shown in FIG. 1.

FIG. 2 discloses an alternative embodiment of a portion of the apparatus shown in FIG. 1. The elements illustrated in FIG. 2 should be substituted for the like-numbered elements in FIG. 1 in order to complete the embodiment. The only change of significance from the embodiment shown in FIG. 1 is that operating coil 52 is connected directly from conductor 95 through normally open switch 61 and normally closed low pressure contact 72A.

According to this embodiment, when switch 80 closes, the pilot signal is transmitted through operating coil 62 so that normally open switch assembly 56 moves switches 58–61 to their closed positions. As a result, the pilot signal is transmitted through closed switch 61, normally closed contact 72A and operating coil 52. Operating coil 52, in turn, moves switches 48–50 to their closed position so that motor 36 begins to operate. As soon as switch 80 opens, the pilot signal through operating coil 62 is interrupted so that switching assembly 56 urges switches 58–61 to their open positions, thus interrupting the circuit path to motor 36.

In the event that switching assembly 56 sticks in the closed position after switch 80 opens, electrical current will continue to be supplied to motor 36. However, the pilot signal will no longer flow through relay coil 100 so that the operation of fan motors 26 and 34 will terminate. Condenser coil 22 and evaporator coil 30 will no longer be cooled by the fans 26 and 34 and the pressure in suction line 18 will decrease. As soon as the pressure decreases below a predetermined value established by sensor 72, contact 72A will open, thereby interrupting the flow of the pilot signal through operating coil 52. When the pilot signal ceases to flow through operating coil 52, switches 48–50 are opened in order to interrupt the supply of electrical power to motor 36.

Figure 3:
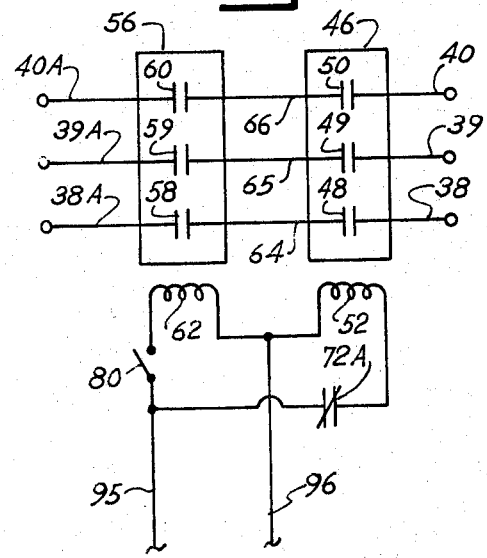
FIG. 3 is a schematic drawing illustrating a third embodiment of the switching apparatus shown in FIG. 1.

Another alternative embodiment of the apparatus shown in FIG. 1 is illustrated in FIG. 3. The elements illustrated in FIG. 3 should be substituted for like-numbered elements shown in FIG. 1 in order to complete the embodiment. The principal change involved in the FIG. 3 embodiment is the elimination of switch 61 and the placement of contacts 72A is series with operating coil 52 between conductors 95 and 96.

According to this embodiment, the pilot signal is continuously supplied through normally closed contacts 72A to operating coil 52 so that switches 48–50 are normally closed. As soon as switch 80 is closed, the pilot signal is also supplied to operating coil 62 so that normally open switches 58–60 are closed, thereby supplying electrical current to motor 36. When switch 80 opens, the transmission of the pilot signal to operating coil 62 is interrupted, and switches 58–60 are urged to their open position. In the event that switches 58–60 stick in the closed position after switch 80 is open, motor 36 will continue to receive electrical current until sensor 72 detects a decrease of pressure in suction line 18 below a predetermined value. At that point in time, contact 72A is opened so that the flow of the pilot signal through operating coil 52 is terminated, thereby opening switches 48–50 and interrupting the flow of electrical current to motor 36.

Those skilled in the art will recognize that the preferred embodiments described are merely exemplary of the present invention and may be altered and modified without departing from the true spirit and scope of the invention as defined in the appended claims.

What is claimed is:

1. In a refrigerant compressor of the type having a compression mechanism for receiving a refrigerant gas from a suction line, compressing the refrigerant gas and discharging the compressed refrigerant gas, a motor for operating the compression mechanism and conductor means for applying electrical power to the motor, improved apparatus for protecting the compressor motor comprising in combination:

first switch means connected in series with the conductor means, said first switch means being normally in an open position and being movable to a closed position;

second switch means connected in series with the first switch means, said second switch means being normally in an open position and being movable to a closed position;

first operating means for moving the first switch means to the closed position in response to a pilot signal and for opening the first switch means in the absence of the pilot signal;

generating means for generating the pilot signal;

third switch means operable in a first state for operatively connecting the generating means to the first operating means and operable in a second state for operatively disconnecting the generating means from the first operating means;

second operating means for urging the second switch means toward the closed position and urging the third switch means into the first state in response to the pilot signal and for urging the second switch means toward the open position and urging the third switch means into the second state in the absence of the pilot signal; and third operating means for transmitting the pilot signal to the first and second operating means in response to a demand for operation of the compressor so that the first and second switch means are moved to their closed positions to apply electrical power to the compressor motor, and for preventing the pilot signal from being transmitted to the first and second operating means in the absence of a demand for operation of the compressor so that the first and second switch means are normally both moved to the open position to stop the compressor motor or the first switch means is moved to the open position alone to stop the compressor motor in case the second switch means fails in the closed position.

2. Apparatus, as claimed in claim 1, wherein the first and second switch means each comprise a magnetic contactor and wherein the third switch means comprises a mechanical switch ganged with the second switch means.

3. Apparatus, as claimed in claim 2, wherein the first operating means comprises first coil means for generating a magnetic field capable of operating the first magnetic contactor and wherein the second operating means comprises second coil means for generating a magnetic field capable of operating the second magnetic contactor.

4. Apparatus, as claimed in claim 3, wherein the generating means comprises a transformer for generating the pilot signal.

5. Apparatus, as claimed in claim 1, wherein the third operating means comprises fourth switch means connected in series with both the first and second operating means for preventing the pilot signal from being transmitted to the first and second operating means when the fourth switch means is opened.

6. Apparatus as claimed in claim 5, wherein the fourth switch means comprises a temperature sensitive thermostat.

7. Apparatus, as claimed in claim 1, wherein the third operating means comprises:

fourth switch means connected in series with the second operating means for preventing the pilot signal from being transmitted to the second operating means when the fourth switch means is opened; and low pressure switch means responsive to the pressure in the suction line and connected in series with the first operating means for preventing pilot signal from being transmitted to the first operating means when the pressure in the suction line decreases below a predetermined value.

8. Apparatus, as claimed in claim 7, wherein the third switch means and the low pressure switch means are connected in series between the generating means and the first operating means.

9. Apparatus, as claimed in claim 8, wherein the fourth switch means comprises a temperature sensitive thermostat.

10. A method of protecting a motor for driving a refrigerant compressor of the type having a compression mechanism for receiving a refrigerant gas from a suction line, compressing the refrigerant gas and discharging the compressed refrigerant gas by use of a first contactor and a second contactor connected in series between a source of electrical power and the compressor motor, a third switch simultaneously operated with the second contactor, a first operating coil for closing the first contactor in response to a pilot signal and for opening the first contactor in the absence of a pilot signal, a second operating coil for urging the second contactor and the third switch toward their closed positions in response to the pilot signal and for urging the second contactor and the third switch toward their open positions in the absence of the pilot signal, and a generator of the pilot signal, said method comprising the steps of:

normally biasing the first and second contactors and the third switch to their open positions;

applying the pilot signal to the second operating coil in response to a demand for operation of the compressor so that the second contactor and third switch are moved to their closed positions;

applying the pilot signal to the second operating coil through the closed third switch so that the first contactor is moved to the closed position and electrical power is applied to the compressor motor through the closed first and second contactors;

blocking the pilot signal from being transmitted to the second operating coil in the absence of a demand for operation of the compressor, so that the second contactor and third switch are biased toward their open positions; and blocking the pilot signal from being transmitted to the first operating coil in the absence of a demand for operation of the compressor, so that the first operating coil opens the first contactor in the event that the second contactor fails in the closed position, whereby the compressor motor is protected from overload conditions.

11. A method, as claimed in claim 10, wherein the step of blocking the pilot signal from being transmitted to the first operating coil comprises the steps of:

detecting the pressure in the suction line of the compression mechanism; and blocking the pilot signal from being transmitted to the first operating coil when the pressure in the suction line decreases below a predetermined value.

12. In a refrigerant compressor of the type having a compression mechanism for receiving a refrigerant gas from a suction line, compressing the refrigerant gas and discharging the refrigerant gas, a motor for operating the compression mechanism and conductor means for applying electrical power to the motor, improved apparatus for protecting the compressor motor comprising in combination:

first switch means connected in series with the conductor means, said first switch means being normally in an open position and being movable to a closed position;

second switch means connected in series with the first switch means, said second switch means being normally in an open position and being movable to a closed position;

first operating means for moving the first switch means to the closed position in response to a pilot signal and for opening the first switch means in the absence of the pilot signal;

generating means for generating the pilot signal;

second operating means for urging the second switch means toward the closed position in response to the pilot signal and for urging the second switch means towards the open position in the absence of the pilot signal;

pressure detection means responsive to the pressure in the suction line for normally transmitting the pilot signal to the first operating means so that the first switch means is normally moved to the closed position and for preventing the transmission of the pilot signal to the first operating means when the pressure in the suction line decreases below a predetermined value; and third operating means for transmitting the pilot signal to the second operating means in response to a demand for operation of the compressor so that electrical power is applied to the compressor motor through the closed first and second switch means and for preventing the pilot signal from being transmitted to the second operating means in the absence of a demand for operation of the compressor, whereby the operation of the motor is normally controlled by the position of the second switch means, and the first switch means opens only when the pressure in the suction line decreases below the predetermined value after the second switch means has failed in the closed position.

13. Apparatus, as claimed in claim 12 wherein the first and second switch means each comprise a magnetic contactor.

14. Apparatus, as claimed in claim 13, wherein the first operating means comprises first coil means for generating a magnetic field capable of operating the first magnetic contactor and wherein the second operating means comprises second coil means for generating a magnetic field capable of operating the second magnetic contactor.

15. Apparatus, as claimed in claim 14, wherein the generating means comprises a transformer for generating the pilot signal.

* * * * *